United States Patent [19]

Searle

[11] Patent Number: 4,783,205
[45] Date of Patent: Nov. 8, 1988

[54] AIRCRAFT ON-BOARD GAS GENERATING APPARATUS

[75] Inventor: Robin H. J. Searle, Brampton, England

[73] Assignee: Normalair-Garrett (Holdings) Ltd., Yeovil, England

[21] Appl. No.: 99,790

[22] Filed: Sep. 22, 1987

[30] Foreign Application Priority Data

Oct. 1, 1986 [GB] United Kingdom ............. 8623605

[51] Int. Cl.[4] ............................................. B01D 53/04
[52] U.S. Cl. ......................................... 55/161; 55/163; 55/179; 55/389
[58] Field of Search ......... 55/18, 21, 68, 75, 161–163, 55/179, 389

[56] References Cited

U.S. PATENT DOCUMENTS

| | | | |
|---|---|---|---|
| 3,922,149 | 11/1975 | Ruder et al. | 55/21 |
| 4,349,357 | 9/1982 | Russell | 55/21 |
| 4,404,005 | 9/1983 | Hamlin et al. | 55/163 |
| 4,496,376 | 1/1985 | Hradek | 55/163 |
| 4,537,607 | 8/1985 | Rogers et al. | 55/163 |
| 4,543,109 | 9/1985 | Hamlin et al. | 55/179 X |
| 4,594,080 | 6/1986 | Tremain et al. | 55/179 |
| 4,661,124 | 4/1987 | Hamlin et al. | 55/21 |
| 4,673,415 | 6/1987 | Stanford | 55/21 |
| 4,681,602 | 7/1987 | Glenn et al. | 55/21 |
| 4,687,013 | 8/1987 | Stevenson | 55/163 X |

FOREIGN PATENT DOCUMENTS

| | | |
|---|---|---|
| 0036285 | 9/1981 | European Pat. Off. |
| 0129304 | 12/1984 | European Pat. Off. ............. 55/389 |
| 0225736 | 6/1987 | European Pat. Off. ............. 55/389 |
| 2177460 | 1/1987 | United Kingdom . |

Primary Examiner—Robert H. Spitzer
Attorney, Agent, or Firm—Larson & Taylor

[57] ABSTRACT

Apparatus for generating oxygen enriched air from a flow of ram air supplied to a hydraulically driven air compressor 10 by way of an inlet 11. After pressure intensification the air is delivered to a gas concentrator unit 50 (shown in FIG. 2) through a supply line 90.

Molecular sieve beds provided by the concentrator unit 50 are cycled through charge/adsorption and purge/-desorbtion phases by pilot valves 65, 66, 67 operated by cams 30, 31, 32 respectively, mounted for rotation on a shaft 33 driven by the compressor through a reduction gear box 35. A flueric partial pressure sensor 80 senses the partial pressure of oxygen in the oxygen-enriched air delivered from the concentrator unit and, by way of low pressure transducers 81, 82, signals a flow control valve 86 to control flow of hydraulic fluid to an inlet 19 of the compressor 10. Variation of the hydraulic flow to the compressor causes corresponding increase of decrease in the rotational speed of the shaft 33 and cams 30, 31, 32 so as to control cycling of the molecular sieve beds to vary the oxygen concentration in the delivered oxygen-enriched air to maintain the partial pressure of oxygen substantially constant irrespective of changes in aircraft altitude.

The apparatus dispenses with a requirement for engine compressor stage bleed air as supply air for the concentrator unit and has minimal requirement for use of electrical systems.

9 Claims, 2 Drawing Sheets

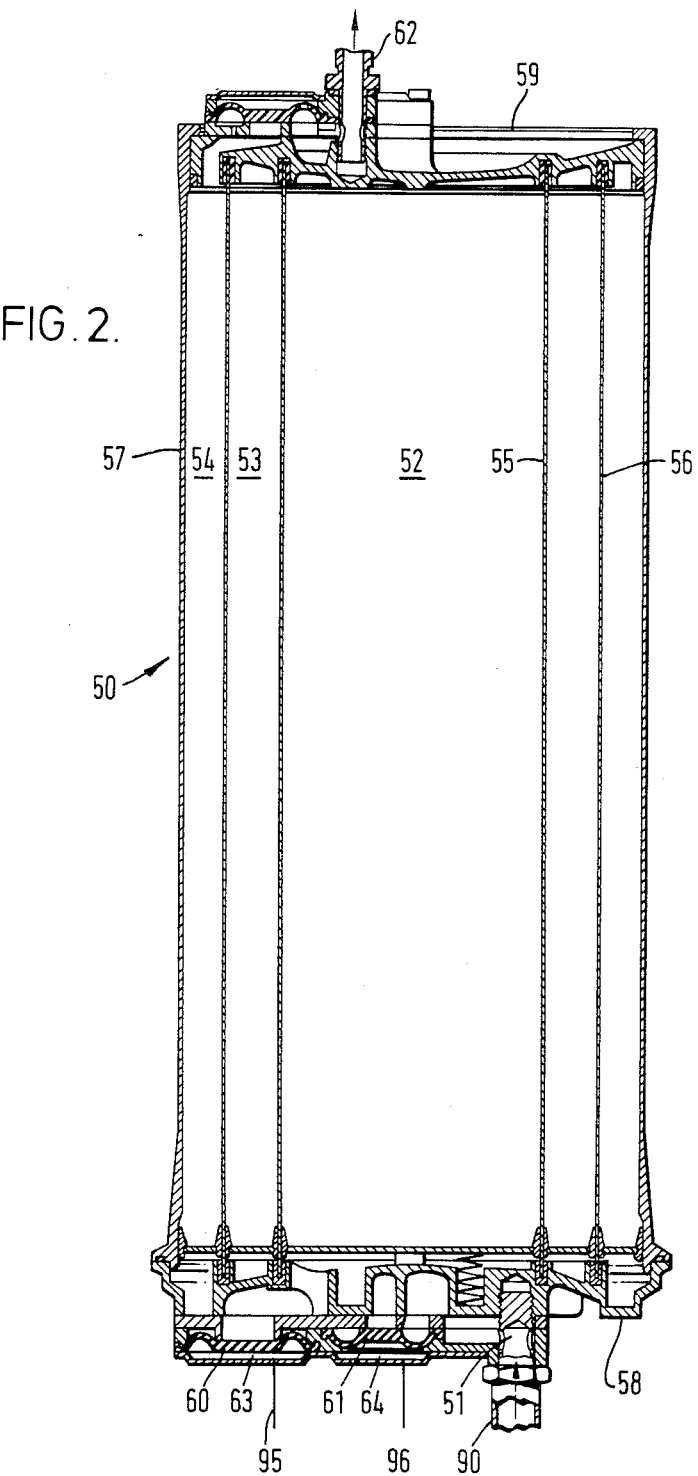

AIRCRAFT ON-BOARD GAS GENERATING APPARATUS

BACKGROUND OF THE INVENTION

1. Field of the Invention

This invention relates to aircraft on-board gas generating apparatus.

2. Description of the Prior Art

Oxygen-enriched air for breathing by aircrew is now frequently produced by an on-board oxygen generating system (OBOGS) in which compressed air bled from an engine of an aircraft is fed to molecular sieve beds containing molecular sieve material having an affinity for retention of nitrogen. The molecular sieve beds are cycled so as to place the beds in overlapping charge/adsorption on-stream and purge/desorption regeneration phases whereby oxygen-enriched air is continuously supplied as product gas.

EP-A No. 0,129,304 (Normalair-Garrett) discloses an OBOGS having three molecular sieve beds and a fixed logic sequencer unit which provides two different overall cycle times for the beds and fixes the relative duration of each phase within the overall cycle time. A switching device which includes a fleuric partial pressure sensor more particularly disclosed in EP-A No. 0,036,285 (Normalair-Garrett), responds to the pertaining concentration of a constituent gas in the product gas delivered by the system and switches between two overall cycle times so as to maintain the concentration of oxygen in the oxygen-enriched air supplied as product gas within predetermined limits by varying the saturation level of the beds and consequently their sieving capability.

Space within an aircraft fuselage is at a premium so that the OBOGS should require the smallest possible space envelope. In minimising the space envelope required to house the OBOGS we have proposed a molecular sieve bed container having a plurality of molecular sieve bed chambers formed by tubular wall members concentrically located within a tubular outer housing and closed at their ends by end closure members. This container is disclosed in EP-A No. 0225736 (Normalair-Garrett). One end closure member of the container incorporates valves for controlling supply of charge air to the sieve bed chambers and venting purge gas from the sieve bed chambers whilst the other end closure member incorporates valves for controlling passage of product gas from the sieve bed chambers to an outlet and portways for permitting some of the product gas to flow back through the sieve bed chambers as purge gas. In a preferred embodiment the valves comprise diaphragm valves, opening and closing of the valves for supply of charge air to the sieve bed chambers and venting of purge gas from the sieve bed chambers being controlled by sequentially operating pneumatic servo-valves switched by an electronic timing device. According to the number of sieve beds and the molecular sieve material with which they are filled the container may be adapted to provide either or both of supplies of oxygen-enriched and nitrogen-enriched product gases. This arrangement provides within a single container a plurality of molecular sieve beds and as such is particularly suited for installation in an aircraft having a limited space envelope for housing an on-board gas generating system.

However, with increasing demands by other aircraft systems for supplies of engine compressor stage bleed air, there is a requirement for a compact on-board gas generating apparatus which does not require bleed air from the engine as its supply gas. Also, it would be advantageous if such apparatus had a minimal requirement for use of electrical systems in control of its operation.

SUMMARY OF THE INVENTION

It is an object of the present invention to provide a compact aircraft on-board gas generating apparatus which does not require engine compressor bleed air as its supply gas and which has minimal requirement for use of electrical control systems.

Accordingly, the present invention provides aircraft on-board gas generating apparatus comprising a gas concentrator unit having a plurality of molecular sieve beds adapted for receiving a flow of compressed air as charge gas and delivering a flow of product gas enriched in one constituent gas, valve means for cycling the sieve beds through charge/adsorption phases and purge/desorption phases, and sensor means for sensing the concentration of the enriched constituent gas in the product gas delivered by the concentrator, characterised by pressure intensifier means adapted for receiving a flow of air at one pressure value and delivering to the concentrator unit a flow of air of a required increased pressure value and further adapted to drive means for operating said valve means to cycle said sieve beds in accordance with control signals output by said sensor means to maintain the concentration value of the constituent gas in the product gas within predetermined limits.

The pressure intensifier means preferably comprises an hydraulically driven gas compressor which may have a plurality of double acting pressurising piston and cylinder assemblies each adapted to provide pressure intensifiction on the up-stroke and the down-stroke of the piston.

Preferably, an intake for delivering air to the pressure intensifier means is of ram air design.

The means for operating the concentrator valve means to control cycling of the molecular sieve beds may comprise pilot valves each having a valve member controlled by a mechanism driven by the pressure intensifier means.

The valve member of each pilot valve may be arranged to open and close, in opposite sequence, ports for relieving the pressure acting on the back of a pair of diaphragm valves one of which diaphragm valves allows supply air to enter a sieve bed and the other of which diaphragm valves allows purge gas to be vented from the sieve bed, the valve member projecting a stem which carries a roller arranged to run on a cam mounted on a shaft driven by the pressure intensifier means fluid motor through a reduction gear box.

Whilst the sensor means may comprise any suitable gas concentration sensing means such as, for example, a galvanic gas concentration sensor, in a preferred embodiment of the invention the sensor means comprises a fleuric partial pressure sensor such as is disclosed in EP-A No. 0,036,285 (Normalair-Garrett). Outputs from a fleuric amplifier of the fleuric partial pressure sensor are measured by a pair of pressure transducers and signals from the pressure transducers are used for either electrical or, preferably, pneumatic control of a flow control valve regulating flow of pressure fluid powering the pressure intensifier means.

BRIEF DESCRIPTION OF THE DRAWINGS

Aircraft on-board gas generating apparatus in accordance with one embodiment of the invention will now be described by way of example and with reference to the accompanying drawings in which:

FIG. 2 shows a gas concentrator unit forming the other part of the aircraft on-board gas separation apparatus in the embodiment of FIG. 1.

DETAILED DESCRIPTION OF THE DRAWINGS

Figure 1:
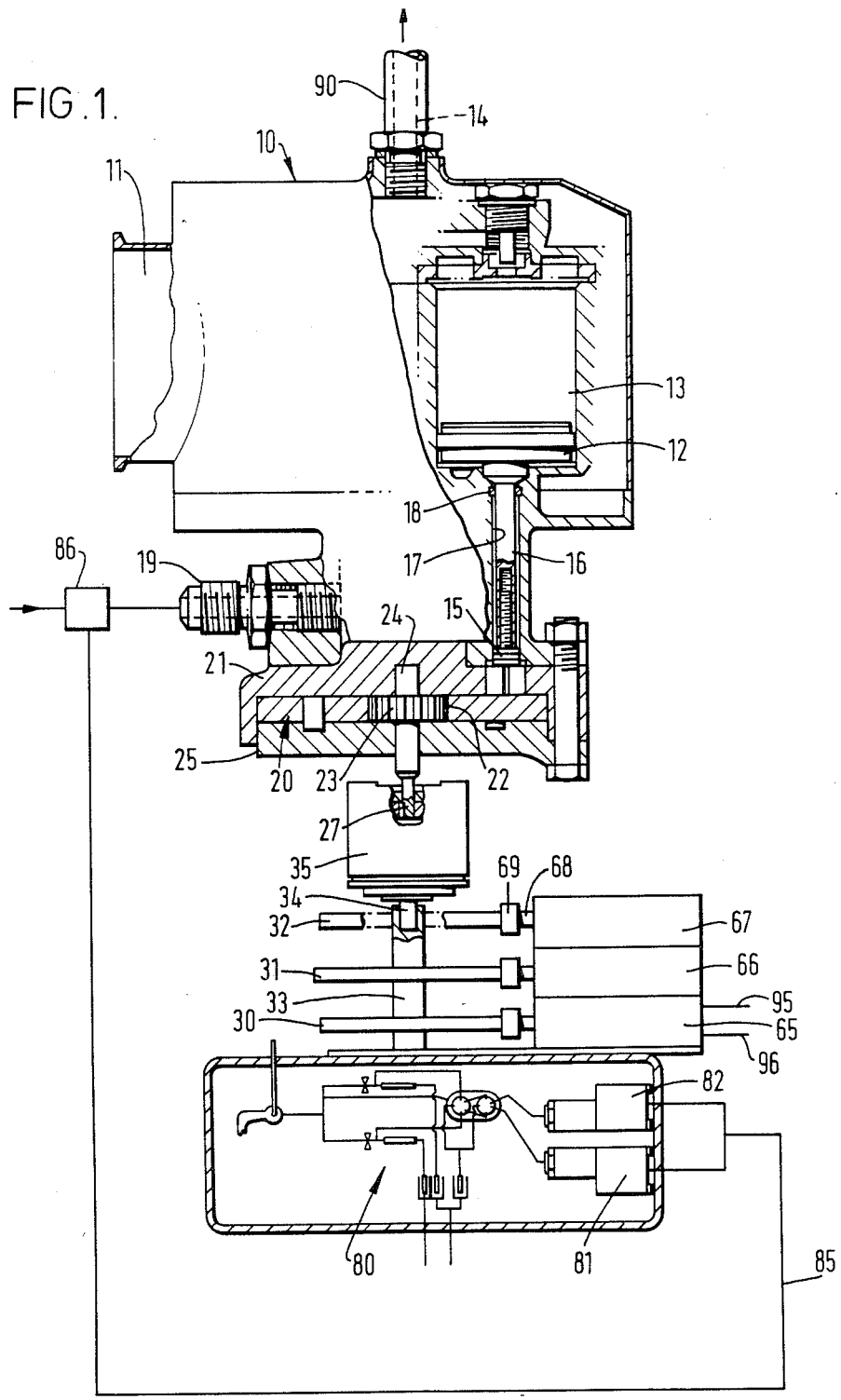
FIG. 1 shows that part of an aircraft on-board gas separation apparatus which is comprised by pressure intensifier means, sieve bed valve operating means and gas concentration sensor means in accordance with one embodiment of the invention.

Referring to the drawings, there is shown a schematic cross-sectional view of aircraft on-board gas generating apparatus which in this embodiment is suited for producing oxygen-enriched air for breathing by aircrew. The apparatus comprises pressure intensifier means which in this embodiment is provided by an hydraulically driven aircompressor 10 (FIG. 1), a gas concentrator unit 50 (FIG. 2) and sensor means which in this embodiment is provided by a flueric partial pressure sensor 80 (FIG. 1).

The compressor 10 provides an inlet 11 for ram air which is delivered through ports (not shown) to three pistons 12 and cylinder 13 assemblies (only one such assembly being shown in the drawing) equi-spaced around a common pitch circle having its centre located on the longitudinal axis of the compressor. Each cylinder 13 is adapted to receive a charge of air for pressure intensification to a required pressure value on both the up-stroke and the down-stroke of its piston 12, the pressure intensified air produced by each stroke of the piston being passed through valved ports and passageways (not shown) to an outlet 14. Each piston 12 is reciprocally driven in its cylinder 13 by a driving piston 15 provided on the end of a piston stem 16 which projects from one face a piston 12 through a cylinder 17 formed as a continuation of cylinder 13 but being of a lesser diameter dimension. The cylinder 17 is sealed from the cylinder 13 by a seal 18 which allows sliding movement of the piston stem 16 therethrough. The pistons 15 are driven in the cylinders 17 by pressurised hydraulic fluid supplied to the compressor 10 through an inlet 19. The hydraulic fluid is passed from the inlet 19 to the cylinders 17 by way of a rotatable port plate 20 and a fixed port plate 21. The rotatable port plate 20 provides at its centre, for its rotation, an internal profile adapted to the form of an outer gear 22 of a gerotor positive displacement mechanism. An internal gear 23 of the gerotor mechanism is carried on a shaft 24 which projects through an end plate 25 of the compressor 10.

The arrangement of ports in the rotatable and fixed port plates and the fluid transfer ducts in the compressor body for passing hydraulic fluid to and from the cylinders 17 are similar to the pressure intensifier device (compressor) which is disclosed in GB-A No. 2,177,460 (Normalair-Garrett) and will not be here described in detail. Also, operation of the compressor 10 is similar to that described in GB-A No. 2,177,460 with the exception that the piston and cylinder assemblies of the compressor 10 in the embodiment of the present invention provide pressure intensification of supply air on both the up-stroke and down-stroke of the pistons, this pressure intensified air being passed to the compressor outlet without a further pressure intensification stage.

Pressure intensified air leaving the compressor 10 at outlet 14 is passed by way of a supply line 90 to an inlet 51 of the concentrator unit 50. The concentrator unit 50 is similar in both construction and operation to the molecular sieve beds container which is disclosed in EP-A No. 0,225,736 (Normalair-Garrett). The unit 50 provides three concentric molecular sieve bed chambers 52, 53, 54 which are filled with zeolite molecular sieve material suited for the adsorption of nitrogen in air passing through the sieve bed chambers. The sieve bed chambers are provided by two tubular wall members 55, 56 concentrically located within an outer tubular housing 57 and are closed at their ends by end closure members 58 and 59. End closure member 58 provides the inlet 51 and incorporates a respective pair of diaphragm valves 60, 61 (only one pair being shown in the drawing) associated with each respective sieve bed chamber. Diaphragm valve 60 controls entry of supply air to its respective sieve bed chamber whilst diaphragm valve 61 controls venting of purge gas from the sieve bed chamber. Oxygen-enriched air leaves the concentrator unit by way of an outlet 62 in end closure member 59.

Pairs of chambers 63 and 64 in the closure member 58 are situated behind the diaphragm valves 60 and 61. A bleed of supply air is passed to each pair of chambers 63 and 64 so that the pressure of supply air in the chambers 63 and 64 acts on all the diaphragm valves 60, 61 to hold them in a closed position. Supply air pressure in the chambers 63, 64 of each pair is arranged to be sequentially relieved so that a diaphragm valve 60 is held closed when its associated diaphragm valve 61 is open and vice versa. Supply air pressure in the chambers 63, 64 is relieved by venting to ambient through ports (not shown) which are opened and closed by pilot valves 65, 66 and 67 (FIG. 1) respectively connected to the pairs of chambers 63, 64 by vent lines 95, 96.

The pilot valves 65, 66 and 67 are shown diagrammatically in FIG. 1 and each projects from its body a valve stem 68 having a roller 69 carried on the projecting end thereof. The rollers 69 of the respective pilot valves 65, 66, 67 are arranged to run on cams 30, 31, 32, respectively, mounted for rotation on a shaft 33 keyed to a drive shaft 34 projecting from a reduction gear box 35. The drive shaft 34 is driven through a reduction gear train (not shown) by the shaft 24 which has a splined end 27 entered into the reduction gearbox 35 and carrying near to its opposite end the internal gear 23 of the gerotor mechanism.

The partial pressure of oxygen in oxygen-enriched air supplied from the concentrator unit 50 for breathing by the crew of an aircraft in which the apparatus is intalled is sensed by the flueric partial pressure sensor 80. In this embodiment the construction and operation of the flueric partial pressure sensor 80 is similar to that described for the flueric partial pressure sensor disclosed in EP-A No. 0,036,285 (Normalair-Garrett). Signals output by the partial pressure sensor 80 are sensed by one or other of a pair of pressure transducers 81, 82 depending upon whether the partial pressure is above or below a desired range required for satisfactory breathing. The pressure transducers convert the signals into either electrical or, preferably, pneumatic signals which are fed by a signal line 85 to a flow control valve 86 controlling supply of hydraulic fluid to the inlet 19 of the compressor 10.

In operation of the apparatus hereinbefore described with reference to the accompanying drawing, ram air supplied to the compressor 10 through ram air inlet 11 is pressure intensified and delivered to the concentrator unit 50. The molecular sieve bed chambers 52, 53, 54 of the concentrator unit 10 are each cycled through a charge/adsorption phase and a purge/desorption phase by operation of their respective pairs of diaphragm valves 60, 61 under control of the respective pilot valves 65, 66, 67. The pilot valves are arranged to be operated by the cams 30, 31, 32 so as to cycle the sieve bed chambers in overlapping sequence whereby as one bed commences a charge/adsorption phase a second bed is producing oxygen-enriched air and the third bed is commencing a purge/desorption phase so that a continuous supply of oxygen-enriched air is made available for breathing by an aircrew member of the aircraft in which the apparatus is installed.

A bleed of oxygen-enriched air delivered by the concentrator unit 10 is fed to the flueric partial pressure sensor 80 and is referenced against a bleed of supply air to the concentrator unit 50. As the altitude at which the aircraft is operating increases the percentage concentration of oxygen in the air delivered to the concentrator unit will fall causing a reduction in the partial pressure of oxygen in the oxygen-enriched air delivered by the concentrator unit if the sieve bed chambers continue to operate at the same cycle speed. Fall in the partial pressure of oxygen in the delivered gas will cause the bridge of the flueric partial pressure sensor to become unbalanced and a signal output by the sensor will be sensed by the pressure transducer 81 and converted into either an electrical or pneumatic signal suitable for driving the flow control valve to increase the flow of hydraulic fluid to the compressor gerotor positive displacement mechanism. With increasing hydraulic fluid flow the speed of rotation of the internal gear 23 of the gerotor mechanism will be increased and with it the speed of rotation of the cams 30, 31, 32 mounted on the shaft 33 and driven by the internal gear of the gerotor mechanism through the reduction gearbox 35. Increasing rotational speed of the cams will increase the speed of operation of the associated pilot valves 65, 66, 67 and hence increase the rate at which the sieve bed chambers are cycled through their charge adsorption and purge/desorption cycles so as to increase the concentration of oxygen in the oxygen-enriched air delivered by the concentrator unit until the partial pressure of oxygen in the oxygen-enriched air is brought back to the value at which the bridge of the flueric partial pressure sensor is in balance.

Similarly, as aircraft operating altitude decreases the percentage concentration of oxygen in air delivered to the concentrator will increase so that the partial pressure of oxygen-enriched air delivered by the concentrator will rise and the bridge of the partial pressure sensor will again be unbalanced. A signal output by the bridge will be sensed by the pressure transducer 82 and converted to a signal suitable for driving the flow control valve to decrease the flow of hydraulic fluid to the compressor gerotor positive displacement mechanism. This will cause the rate at which the sieve bed chambers are cycled to decrease so that the concentration of oxygen in the oxygen-enriched air delivered by the concentrator unit will fall until the partial pressure is returned to the value at which the bridge of the partial pressure sensor is balanced.

Aircraft on-board gas concentration apparatus in accordance with the present invention is provided as a compact unit which dispenses with the requirement for engine compressor stage bleed air as supply air for the gas concentrator unit and which has minimal requirement for use of electrical systems.

It should be appreciated that whilst the apparatus of the particular embodiment hereinbefore described with reference to and shown in the accompanying drawing is suited for producing oxygen-enriched air, by suitable modification of the concentrator the apparatus could be used for producing separate supplies of oxygen-enriched air and nitrogen-enriched air.

What is claimed is:

1. Aircraft on-board gas generating apparatus comprising a gas concentrator unit having a plurality of molecular sieve beds each adapted for receiving a flow of compressed air as charge gas and delivering a flow of product gas enriched in one constituent gas, valve means operably connected with the sieve beds for cycling the sieve beds through charge/adsorption phases and purge/desorbtion phases, product gas sensor means having a connection with a delivery outlet of the concentrator unit for sensing the concentration of the enriched constituent gas in the product gas delivered by the concentrator unit, pressure intensifier means adapted for receiving a flow of air at one pressure value and delivering to the concentrator unit a flow of air at a required increased pressure value, and means driven by the pressure intensifier means for operating the valve means to cycle the sieve beds in accordance with control signals output by the sensor means, whereby the concentration value of the constituent gas in the product gas delivered by the concentrator unit is maintained within predetermined limits.

2. Aircraft on-board gas generating apparatus as claimed in claim 1, wherein the pressure intensifier means comprises an hydraulically driven gas compressor.

3. Aircraft on-board gas generating apparatus as claimed in claim 2, wherein the hydraulically driven gas compressor comprises a plurality of piston and cylinder assemblies each adapted to provide pressure intensification on the up-stroke and the down-stroke of the piston.

4. Aircraft on-board gas generating apparatus as claimed in claim 1, wherein said valve means comprise a respective pair of diaphragm valves connected with a respective one of said sieve beds, and said valve operating means comprise a respective pilot valve for each pair of diaphragm valves.

5. Aircraft on-board gas generating apparatus as claimed in claim 4, wherein each pilot valve comprises a valve member arranged to open and close, in opposite sequence, ports for relieving pressure which urges said respective pair of diaphragm valves towards a closed position.

6. Aircraft on-board gas generating apparatus as claimed in claim 5, wherein the valve member of each said pilot valve is adapted for operation by a respective cam mounted on a shaft driven by said pressure intensifier means.

7. Aircraft on-board gas generating apparatus as claimed in claim 1, wherein said gas concentrator unit comprises concentric molecular sieve bed chambers.

8. Aircraft on-board gas generating apparatus as claimed in claim 7, wherein said sieve bed chambers are filled with a zeolite molecular sieve material suited for adsorption of nitrogen in air passing through said chambers whereby product gas enriched in oxygen is delivered by the apparatus.

9. Aircraft on-board gas generating apparatus as claimed in claim 1, wherein an inlet to said pressure intensifier means is suited for receiving ram air.

* * * * *